(12) United States Patent
Evans

(10) Patent No.: US 7,801,478 B2
(45) Date of Patent: Sep. 21, 2010

(54) SYSTEMS FOR AND METHODS OF REMOTE HOST-BASED MEDIA PRESENTATION

(75) Inventor: Charles Evans, Corvallis, OR (US)

(73) Assignee: Marvell International Technology Ltd. (BM)

( * ) Notice: Subject to any disclaimer, the term of this patent is extended or adjusted under 35 U.S.C. 154(b) by 416 days.

(21) Appl. No.: 11/121,402

(22) Filed: May 3, 2005

(65) Prior Publication Data

US 2006/0250282 A1 Nov. 9, 2006

(51) Int. Cl.
*H04H 40/00* (2008.01)
*G06F 13/12* (2006.01)

(52) U.S. Cl. .............. 455/3.06; 455/41.2; 455/41.3; 370/278; 700/94; 710/62; 709/238; 709/246; 709/247

(58) Field of Classification Search ............ 710/62; 455/3.06, 41.2, 41.3; 370/278; 700/94; 709/238, 709/246, 247; 314/50
See application file for complete search history.

(56) References Cited

U.S. PATENT DOCUMENTS

| | | | | |
|---|---|---|---|---|
| 5,774,798 | A * | 6/1998 | Gaskill | 455/186.1 |
| 5,809,245 | A * | 9/1998 | Zenda | 709/217 |
| 6,035,349 | A * | 3/2000 | Ha et al. | 710/68 |
| 6,606,281 | B2 * | 8/2003 | Cowgill et al. | 369/11 |
| 6,959,448 | B1 * | 10/2005 | Seo | 725/87 |
| 7,043,479 | B2 * | 5/2006 | Ireton | 707/10 |
| 7,142,934 | B2 * | 11/2006 | Janik | 700/94 |
| 7,610,013 | B2 * | 10/2009 | Suturdja | 455/3.06 |
| 2002/0013784 | A1 * | 1/2002 | Swanson | 707/104.1 |
| 2002/0033828 | A1 * | 3/2002 | Deering et al. | 345/502 |
| 2002/0040255 | A1 * | 4/2002 | Neoh | 700/94 |
| 2002/0075816 | A1 * | 6/2002 | Beckwith | 370/278 |
| 2003/0074474 | A1 * | 4/2003 | Roach et al. | 709/246 |
| 2003/0220705 | A1 * | 11/2003 | Ibey | 700/94 |
| 2004/0055446 | A1 * | 3/2004 | Robbin et al. | 84/615 |
| 2004/0160907 | A1 * | 8/2004 | Perlman | 370/319 |
| 2004/0181667 | A1 * | 9/2004 | Venters et al. | 713/164 |
| 2004/0253925 | A1 * | 12/2004 | Caffrey et al. | 455/63.1 |
| 2005/0123135 | A1 * | 6/2005 | Hunt et al. | 380/200 |
| 2005/0130586 | A1 * | 6/2005 | Gnuschke et al. | 455/3.06 |
| 2005/0144253 | A1 * | 6/2005 | Yoshino et al. | 709/217 |
| 2005/0159830 | A1 * | 7/2005 | Yeh | 700/94 |
| 2005/0273790 | A1 * | 12/2005 | Kearney et al. | 719/328 |
| 2006/0026302 | A1 * | 2/2006 | Bennett et al. | 709/246 |

(Continued)

FOREIGN PATENT DOCUMENTS

CN 1602046 A * 3/2005

(Continued)

OTHER PUBLICATIONS

'A Review on Wireless Home Network Technologies' by Vaxevanakis et al., Mobile Computing and Communications Review, vol. 7, No. 2, discloses a 'digital networked house' connecting computers and other devices wirelessly.*

(Continued)

*Primary Examiner*—Henry W. H. Tsai
*Assistant Examiner*—Steven G Snyder

(57) ABSTRACT

An electronic device includes a first communication interface operable to receive a decoded digital data set from an apparatus remote from the electronic device, and a first circuit coupled to the first communication interface and operable to enable an output device to provide an output representing the data set.

24 Claims, 2 Drawing Sheets

U.S. PATENT DOCUMENTS

| | | | |
|---|---|---|---|
| 2006/0029093 A1* | 2/2006 | Van Rossum | 370/432 |
| 2006/0294268 A1* | 12/2006 | Yang et al. | 710/62 |
| 2008/0034096 A1* | 2/2008 | Tourzni et al. | 709/227 |
| 2008/0175403 A1* | 7/2008 | Tan et al. | 381/77 |

FOREIGN PATENT DOCUMENTS

| | | | |
|---|---|---|---|
| JP | 2003060999 A | * | 2/2003 |
| KR | 2002095344 A | * | 12/2002 |

OTHER PUBLICATIONS

'SyncTap: Synchronous User Operation for Spontaneous Network Connection' by Rekimoto, published online May 1, 2004, discloses the technique for establishing wireless connections between two devices. Specifically teaches using a PDA as a remote controller for a television.*

'Simplefi Your Digital Music' by Bill Howard, PCMagazine, Mar. 13, 2002.*

'320D Compellor Owners Manual' Revision 1, Aphex Systems Ltd, 2003.*

'Pumping on Your Stereo' by Jennifer Farwell, Smart Computing, Oct. 2002, vol. 8 Issue 10.*

'S/PDIF Digital to Analogue Converter' by Randy McAnally and Rod Elliott, Jan. 12, 2002.*

'Choosing a PDA 3: Wireless Options' by AWrigtht on Brighthand.com Nov. 14, 2004.*

'Squeezebox Owner's Guide' by Slim Devices, Inc., copyright 2003.*

'IEEE 802.11b/g Wireless LAN USB Adapter User's Guide' Version 1.0, USB Gear, Jul. 12, 2004.*

'Home Networking With Microsoft Windows XP Step by Step' by Danda et al., copyright 2001.*

Article from Internet website—www.bbc.cl.uk/digitalradio Title: BBC Digital Radio Date printed: Apr. 22, 2005 Pertinent pp. 2.

Simplefi image from *Simplefi Your Digital Music*, Bill Howard, PC Magazine Mar. 13, 2002 *available at* http://www.pcmag.com/article2/0,2817,15384,00.asp (last accessed Mar. 28, 2009).

Simplefi Wireless Digital Audio Receiver installation & user guide, Motorola, 2001 *available at* http://ec1.images-amazon.com/media/i3d/01/A/man-migrate/MANUAL000039006.pdf (last accessed Mar. 28, 2009).

Atkinson, J., "Slim Devices Squeezebox WiFi D/A processor," *Stereophile*, 3 pgs. (Sep. 2006) *available at* http://www.stereophile.com/digitalprocessors/906slim.

* cited by examiner

SYSTEMS FOR AND METHODS OF REMOTE HOST-BASED MEDIA PRESENTATION

BACKGROUND

Typically, in order to play media content, such as audio and/or video content, that is encoded in a compression format such as, for example, MP3 or MPEG, the content must be decompressed and converted to an analog signal by, for example, a digital-to-analog (D/A) converter. Because most personal computers (PCs) are configured to store and/or retrieve encoded media content, as well as perform decompression and D/A conversion functions, the PC is, for many, the preferred mode of playing such content. Others, however, prefer to play media content in a location remote from a PC. To this end, portable player devices, such as portable MP3 players, have become extremely popular.

An MP3 player receives and stores audio files encoded in the MP3 format from a device, such as a PC or server. The MP3 player is then able to decompress the file, convert the file to an analog signal and amplify the analog signal to allow the file to be heard via an output device, such as headphones. However, in order to reduce the cost and complexity of a conventional MP3 player, the MP3 player is solely configured to decode files formatted in MP3. If it is desired that a portable device be able to play files formatted in a variety of compression or other encoding schemes, then such device must be configured to do so. Such an increase in device capability typically entails a corresponding increase in the cost and complexity of the device attributable to additionally required hardware and/or software and, in some cases, licensing costs associated with the use thereof.

SUMMARY

According to an embodiment of the invention, an electronic device includes a first communication interface operable to receive a decoded digital data set from an apparatus remote from the electronic device, and a first circuit coupled to the first communication interface and operable to enable an output device to provide an output representing the data set.

The electronic device allows any audio or video file that the apparatus is configured to play, regardless of the compression scheme under which such file is encoded, to be output by the output device in a location remote from the apparatus

DETAILED DESCRIPTION

Figure 1:
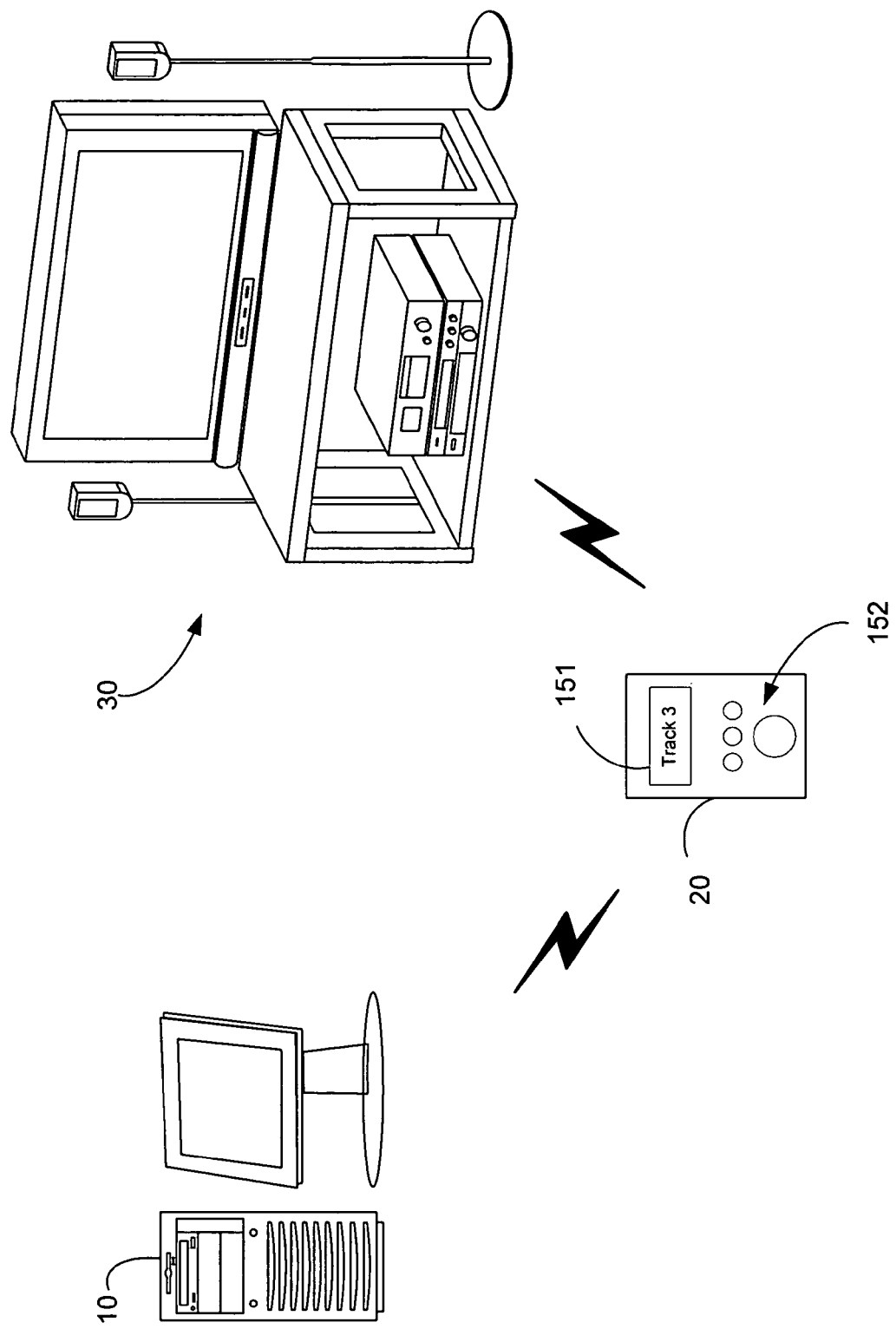
FIG. 1 is a schematic view of a system according to an embodiment of the invention.
Figure 2:
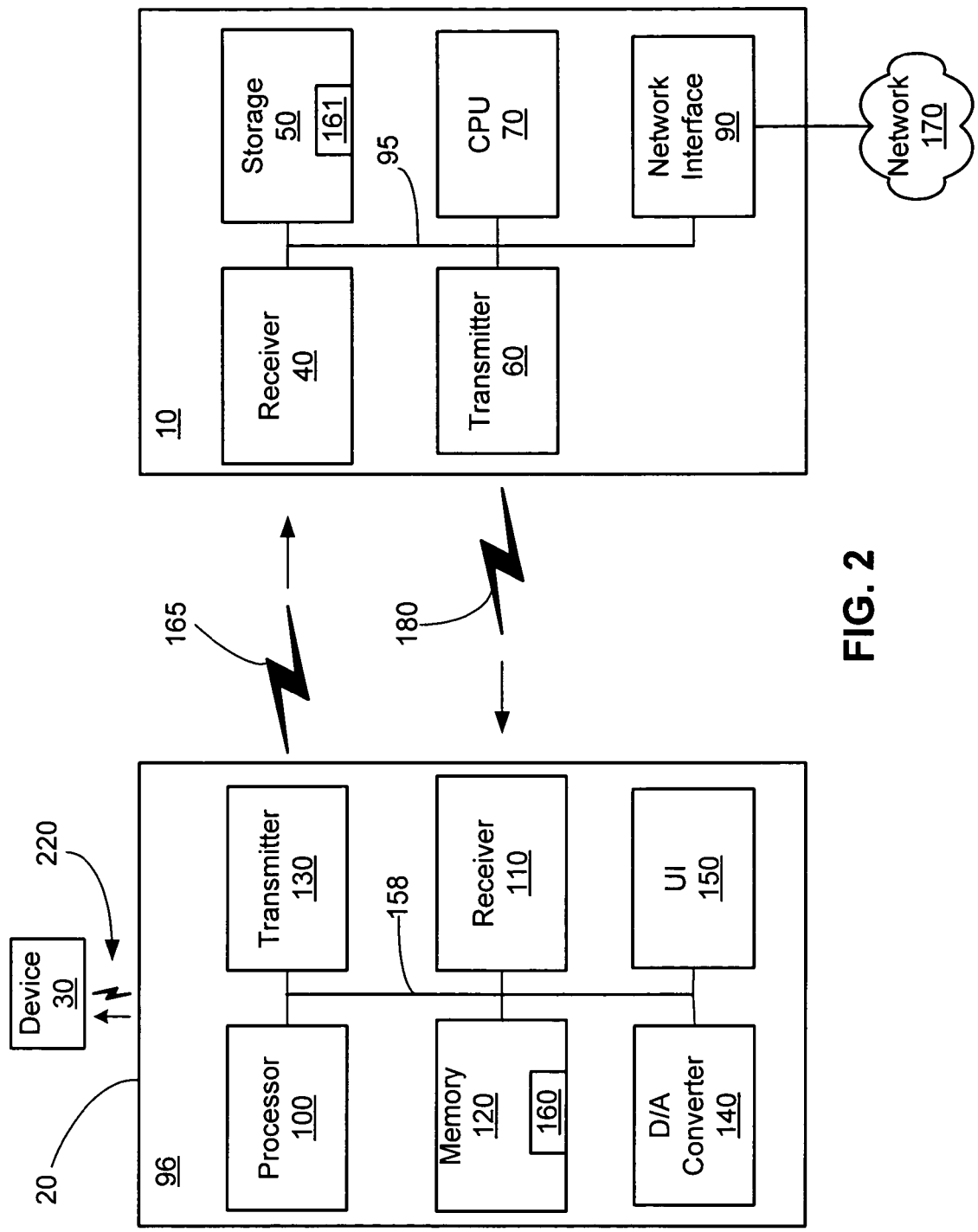
FIG. 2 is a functional block diagram of the system illustrated in FIG. 1 according to an embodiment of the invention.

FIGS. 1 and 2 illustrate an electronic system including a computer 10 and a host-based media player 20, according to one or more embodiments of the invention. The components of the computer 10 and/or media player 20 described herein are exemplary and are not intended to suggest any limitation as to the scope of use or functionality of embodiments of the invention. Embodiments of the computer 10 and/or media player 20 should not be interpreted as having any particular dependency or requirement relating to any one component or combination of components illustrated in and described with reference to FIGS. 1 and 2.

FIG. 1 is a schematic view of an apparatus, such as a personal computer 10, and an electronic device, such as a remote media player 20, according to an embodiment of the invention. As discussed more fully with reference to FIG. 2, the computer 10 is operable to decode encoded data sets, such as audio and video files and, in an embodiment, wirelessly transmit the decoded data sets to the media player 20 for subsequent output on one or more electronic output devices 30 communicatively coupled to the media player. The devices 30 may include, for example, televisions, stereo receivers, multimedia recording devices, and any other electronic device operable to provide an output representing an audio and video (multimedia) data set.

Specifically, the computer 10 is operable to access and decode an encoded file and transmit the decoded file to the media player 20 via an electromagnetic signal such as an infrared (IR) or radio frequency (RF) signal. The media player 20, in turn, is able, if necessary, to convert this data set into an analog signal that can be output as audio and/or video by the device 30. Consequently, any audio or video file that the host computer 10 is configured to play, regardless of the compression scheme under which such file is encoded, can be output by a device 30 in a location remote from the computer.

Referring to FIG. 2, the computer 10 includes the following components: a receiver 40, a storage device 50 such as a hard disk drive, a transmitter 60, a central processing unit (CPU) 70, and a network interface 90 according to an embodiment of the invention. A bus 95 couples the computer components to one another. In an alternative embodiment, the receiver 40 and/or transmitter 60 may be peripheral devices coupled to the computer 10.

The media player 20 includes a housing 96 within which are at least partially disposed the following components: a first circuit such as a processor 100, a first communication interface, such as a receiver 110, a memory 120, a second communication interface, such as a transmitter 130, a second circuit such as a D/A converter 140, and a user interface (UI) 150, which may include a display 151 (FIG. 1), such as a liquid-crystal display (LCD), and controls 152 (FIG. 1), such as buttons and/or knobs, according to an embodiment of the invention. A bus 158 couples the media player components to one another.

In operation, according to an embodiment of the invention, a user wishing to use one or more devices 30 to listen to and/or view media content stored on or otherwise accessible by the computer 10 uses the media player 20 to request such content. For example, in an embodiment, the media player 20 may have stored in the memory 120 a list 160 of content files that are stored on the computer 10 and available for retrieval. Additionally, the media player 20 is configured to present this list 160 on the display 151. Accordingly, the user, by viewing the display 151 and employing one or more controls 152, can interact with the displayed list 160 by, for example, moving a cursor among the listed files and selecting a file for retrieval by the computer 10. Alternatively, this interaction may be achieved by using, for example, a keyboard (not shown), mouse (not shown), or any other conventional input device.

Alternatively, the user, by employing one or more controls 152, may prompt the media player to retrieve from the computer 10 a list 161 of content files stored in the storage 50 and available for retrieval. Specifically, the user may operate the media player 20 such that the media player transmitter 130 transmits signals 165 to the receiver 40. Via these signals 165, the user may use the media player 20 to request that the computer 10 transmit a copy of the list 161 to the media player receiver 110 via signals 180. The signals 165 and 180 may be optical signals, such as IR signals, RF signals that conform to a communication protocol such as Bluetooth, or any other wireless signals. In a manner similar to that described above, the user may subsequently select a file for retrieval by the computer 10. Alternatively, the media player 20 and computer 10 may communicate with each other via signals transmitted over a conventional cable (not shown).

Upon user selection of a file, the media player transmitter 130 transmits signals 165 modulated to carry a request for the selected file to the receiver 40, in the computer 10. After receiving a request for the selected file from the receiver 40, the CPU 70 checks the list 161 to determine whether the list contains the content file indicated by the request. Alternatively, the CPU 70 may access, via the network interface 90, a similar list (not shown) of available content files, as well as the content files themselves, stored, for example, on a remote server (not shown) associated with a network 170 such as a local-area network (LAN) or a wide-area network (WAN) such as the Internet.

The CPU 70 then identifies the scheme under which the content file is encoded, and decodes the requested content file by executing an appropriate decompression algorithm. The transmitter 60 then transmits the decoded file via signals 180 to the receiver 110 of the media player 20. Note that the CPU 70 need not decode the entire content file prior to the transmitter 60 transmitting the file to the media player 20. Instead, portions of the content file may be sequentially decoded and transmitted and in this way the content file may be "streamed" to the media player 20.

Depending on the capabilities of the device 30 to be used to present the decoded media content, the media player 20, upon receiving the file from the computer 10, may employ the D/A converter 140 to convert the file into an analog signal. For example, if the device 30 is incapable of D/A conversion, then the user may employ the controls 152 to toggle a D/A conversion function of the media player 20 to an enabled setting. Consequently, the D/A converter 140 converts the file into an analog signal that the media player transmits to the device 30. If the device 30 is capable of D/A conversion, then the user may employ the controls 152 to toggle the D/A conversion function of the media player 20 to a disabled setting. In such a case, the media player transmits the media content in its digital form to the device 30 for subsequent D/A conversion by the device.

In an embodiment, the media player 20 transmits the media content, whether in analog or digital form, to the one or more devices 30 via signals 220. The signals 220 may be IR signals, RF signals that conform to a communication protocol such as Bluetooth, or any other wireless signals. Alternatively, the media player 20 can employ a port (not shown) to communicate the media content over a cable (not shown) to a port (not shown) of the one or more devices 30. The ports may operate according to any plug-and-socket connection standard such as Universal Serial Bus or IEEE 1394 which are known in the art, or may be configured to receive and employ conventional audiovisual-equipment cables. Where the media player 20 transmits the content to the devices 30 over a wireless communication link, the devices must include a suitable receiver, or such a receiver must be coupled to the devices.

In an embodiment, a requested audio file may include a video component. Such a video component may include, for example, animation, a still image, information pertaining to a song associated with the audio file and/or other graphics. In such case, the media player 20 may function to transmit an audio component of the file to an audio device 30 for audio output while transmitting the video component to a video device 30 for output of the graphics.

In an embodiment, if the user communicatively couples a device 30, such as a television, having a display to the media player 20, the media player may display the list of content files available for retrieval on the display of the device. The user may then use the controls 152 to move a cursor or other selection device around the display of the device 30 to select a file for retrieval.

Other embodiments of the arrangement shown in FIGS. 1 and 2 are contemplated. For example, the media player 20 and computer 10 may respectively include more or fewer than all of the components illustrated in FIG. 2. In another embodiment, the functionality of the media player 20 is split between the computer 10 and devices 30. In this embodiment, the computer 10 stores the list 160 of content files and communicates this list over a suitable communication link to the devices 30. The devices 30, in turn, display the list 160 on a suitable one of the devices, such as a television. A user then uses a conventional remote control, for example, to select the desired content file. In response to the user selecting a content file, the devices 30 communicate identification information for this file to the computer 10. The computer 10 thereafter operates as previously described to access and decode the selected content file, and to communicate the decoded data for the file to the devices 30. In this embodiment, the devices 30 must of course include circuitry for implementing the required functionality of this embodiment. This may be done through an external component (not shown in FIGS. 1 and 2) coupled to the devices 30.

The described embodiments of the invention are operational with and/or may include numerous general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Although embodiments of the system described herein may allude, for exemplary purposes, to certain types of computer-readable media that the system includes or with which the system interacts, it should be recognized that such embodiments may include or interact with a variety of computer-readable media.

Computer-readable media can be any available media that can be included and/or accessed by the computer 10 and/or media player 20 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium that can be used to store information and that can be included and/or accessed by the computer 10 and/or media player 20. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. An electronic device, comprising:
   a first communication interface operable to receive a decoded digital data set from an apparatus remote from the electronic device via a first wireless signal, wherein the decoded digital data set was decoded by the apparatus from a content file in an audio compression or encoding scheme;
   a circuit coupled to the first communication interface and operable to enable an output device remote from the electronic device to provide an output representing the decoded digital data set;
   a display for displaying a list of content files that are stored on the apparatus;
   a user input control for receiving a user input indicative of a selection of a content file from the list of content files shown on the display; and
   a second communication interface operable to transmit the selection for the content file to the apparatus remote from the electronic device;
   wherein, in response to the selection of the content file by the user input control, the first communication interface and circuit receive the content file stored on the apparatus as the decoded digital data set, wherein the electronic device transmits the decoded data set to the output device via a second wireless signal, wherein the electronic device does not decode the decoded digital data set using any audio compression or encoding scheme.

2. The electronic device of claim 1 wherein the apparatus comprises a personal computer.

3. The electronic device of claim 1 wherein the decoded digital data set comprises a file including audio and video data.

4. The electronic device of claim 1 wherein the output device comprises one of a television and a receiver.

5. The electronic device of claim 1, further comprising a second circuit operable to convert the decoded digital data set into an analog signal and provide the analog signal to the output device.

6. The electronic device of claim 5, wherein the second circuit comprises a digital-to-analog converter.

7. The electronic device of claim 1 wherein the circuit is operable to provide the decoded digital data set in a digital format to the output device.

8. An electronic system, comprising:
   an apparatus comprising:
   a memory containing content files;
   a first circuit that receives one or more of the content files from the memory and is operable to decode, using an audio compression or encoding scheme, an encoded digital data set contained in any of the content files; and
   an electronic device remote from the apparatus, the electronic device comprising:
      a first communication interface operable to receive the decoded digital data set;
      a second circuit operable to receive the decoded digital data set from the first communication interface and transmit the decoded data set to an output device remote from the apparatus and electronic device via a wireless signal so as to enable the output device to provide an output representing the decoded digital data set;
      a display for displaying a list of the content files; and
      a user input control for receiving a user input indicative of a selection of a content file from the list of content files displayed on the display; and
      a second communication interface operable to transmit the selection for the content file to the apparatus remote from the electronic device;
   wherein, in response to the selection of the content file by the user input control the first communication interface and second circuit receive the content file stored on the apparatus as the decoded digital data set and the electronic device transmits the decoded data set to the output device, wherein the electronic device does not decode the digital data set using any audio compression or encoding scheme.

9. The electronic system of claim 8 wherein the first circuit comprises a computer.

10. The electronic system of claim 8 wherein the output device comprises one of a television and a receiver.

11. A method, comprising:
    storing content files in an apparatus;
    displaying a list of the content files on an electronic device at a location remote from the apparatus;
    selecting on the electronic device, a content file from the displayed list of the content files, wherein the content file contains an encoded digital data set;
    in response to the selecting, the electronic device transmitting the selection to the apparatus via a first communication interface;
    decoding the encoded digital data set at the apparatus remote from the electronic device and receiving at a second communication interface of the electronic device the decoded digital data set from the apparatus; and
    enabling, with the electronic device, an output device to provide an output representing the decoded digital data set by sending a wireless signal containing the decoded digital data set from the electronic device to the output device, wherein the output device is remote from the apparatus and the electronic device, and the electronic device does not decode the digital data set using any audio compression or encoding scheme.

12. The method of claim 11, wherein the displaying comprises displaying the list on the output device.

13. The electronic device of claim 1, further comprising a memory in communication with the display and the first communication interface, the memory containing the list of content files that are stored on the apparatus.

14. The electronic device of claim 1, further comprising a conversion circuit operable to convert the digital data set into an analog signal and in communication with a second control of the electronic device, wherein manual operation of the second control selectively allows the decoded digital data set received by the first communication interface to be either processed or not processed by the conversion circuit.

15. The electronic system of claim 8, wherein the electronic device further comprises an auxiliary memory in communication with the display and the first communication interface, the auxiliary memory containing the list of content files that are stored on the apparatus.

16. The electronic system of claim 8, wherein the electronic device further comprises a third circuit operable to convert the digital data set into an analog signal and in communication with a second control of the electronic device, wherein manual operation of the second control selectively allows the decoded digital data set received by the first communication interface to be either processed or not processed by the digital-to-analog converter.

17. An electronic device, comprising:
a first communication interface operable to receive a decoded digital data set from an apparatus remote from the electronic device, wherein the decoded digital data set was decoded by the apparatus from a content file in an audio compression or encoding scheme;
a first circuit in communication with the first communication interface and operable to enable an output device remote from the apparatus and electronic device to provide an output representing the decoded digital data set, wherein the electronic device does not decode the digital data set using any audio compression or encoding scheme;
a display for displaying a list of content files that are stored on the apparatus;
a second communication interface operable to transmit a selection from the list of content files indicative of a user input to the apparatus remote from the electronic device; and
a second circuit operable to convert the decoded digital data set into an analog signal and in communication with a control of the electronic device, wherein manual operation of the control selectively allows the decoded digital data set received by the first communication interface to be either processed or not processed by the second circuit.

18. The electronic device of claim 17, wherein said second circuit comprises a digital-to-analog converter.

19. An electronic system, comprising:
an apparatus comprising:
a memory containing content files;
a first circuit that receives one or more of the content files from the memory and is operable to decode, using an audio compression or encoding scheme, an encoded digital data set contained in any of the content files; and
an electronic device remote from the apparatus, the electronic device comprising:
a first communication interface operable to receive the decoded digital data set;
a second circuit remote from the first circuit and operable to receive the decoded digital data set from the first communication interface and enable an output device remote from the apparatus and the electronic device to provide an output representing the decoded digital data set, wherein the electronic device does not decode the digital data set using any audio compression encoding scheme;
a display for displaying a list of the content files;
a second communication interface operable to transmit a selection from the list of the content files to the apparatus remote from the electronic device; and
a third circuit operable to convert the data set into an analog signal and in communication with a user input control of the electronic device, wherein manual operation of the user input control selectively allows the decoded digital data set received by the first communication interface to be either processed or not processed by the third circuit.

20. The electronic system of claim 19, wherein said third circuit comprises a digital-to-analog converter.

21. An electronic device, comprising:
a first communication interface operable to receive a decoded digital data set from an apparatus remote from the electronic device, wherein the decoded digital data set was decoded by the apparatus from a content file in an audio compression or encoding scheme;
a first circuit in communication with the first communication interface and operable to enable an output device remote from the apparatus and the electronic device to provide an output representing the digital data set, wherein the electronic device does not decode the digital data set using any audio compression or encoding scheme;
a first user input control for receiving a user input indicative of a selection of a content file from a displayed list of content files that are stored on the apparatus;
a second communication interface operable to transmit the selection from the list of the content files indicative of the user input to the apparatus; and
a second circuit operable to convert the digital data set into an analog signal and in communication with a second user input control of the electronic device, wherein manual operation of the second control selectively allows the decoded digital data set received by the first communication interface to be either processed or not processed by the second circuit.

22. An electronic system, comprising:
an apparatus comprising:
a memory containing content files;
a first circuit that receives one or more of the content files from the first memory and is operable to decode, using an audio compression or encoding scheme, an encoded digital data set contained in any of the content files; and
an electronic device remote from the apparatus, the electronic device comprising:
a first communication interface operable to receive the decoded digital data set;
a second circuit remote from the first circuit and operable to receive the decoded digital data set from the first communication interface and enable an output device remote from the apparatus and the electronic device to provide an output representing the digital data set, wherein the electronic device does not decode the digital data set using any audio compression or encoding scheme;
a first user input control for receiving a user input indicative of a selection of a content file from a displayed list of content files that are stored on the apparatus;
a second communication interface operable to transmit the selection from the list of the content files indicative of the user input to the apparatus; and
a third circuit operable to convert the digital data set into an analog signal and in communication with a second user input control of the electronic device, wherein manual operation of the second user input control selectively allows the decoded digital data set received by the first communication interface to be either processed or not processed by the third circuit.

23. The electronic device of claim 1, wherein the electronic device receives a first part of the decoded digital data before the apparatus has decoded a second part of the decoded digital data set.

24. The electronic system of claim 8, wherein the electronic device receives a first part of the decoded digital data before the apparatus has decoded a second part of the decoded digital data set.

* * * * *